United States Patent
Tagawa et al.

(10) Patent No.: US 10,006,386 B2
(45) Date of Patent: Jun. 26, 2018

(54) FUEL VAPOR PROCESSING APPARATUS

(71) Applicants: AISAN KOGYO KABUSHIKI KAISHA, Obu-shi, Aichi-ken (JP); TOYOTA JIDOSHA KABUSHIKI KAISHA, Toyota-shi, Aichi-ken (JP)

(72) Inventors: Naoyuki Tagawa, Nagoya (JP); Minoru Akita, Ama (JP); Yoshikazu Miyabe, Obu (JP); Tatsuhiko Akita, Okazaki (JP); Yuusaku Nishimura, Toyota (JP); Keita Fukui, Fujinomiya (JP)

(73) Assignees: AISAN KOGYO KABUSHIKI KAISHA, Obu-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 106 days.

(21) Appl. No.: 15/355,972

(22) Filed: Nov. 18, 2016

(65) Prior Publication Data

US 2017/0145932 A1 May 25, 2017

(30) Foreign Application Priority Data

Nov. 19, 2015 (JP) ................................ 2015-226576

(51) Int. Cl.
*B01D 53/02* (2006.01)
*F02D 41/00* (2006.01)
(Continued)

(52) U.S. Cl.
CPC ....... *F02D 41/003* (2013.01); *B01D 53/0407* (2013.01); *B01D 53/0454* (2013.01);
(Continued)

(58) Field of Classification Search
CPC ...... B01D 2253/102; B01D 2257/7022; B01D 2259/4516; B01D 53/0407;
(Continued)

(56) References Cited

U.S. PATENT DOCUMENTS 5,315,980 A * 5/1994 Otsuka ............... F02M 25/0809
                                                             123/198 D
5,623,914 A * 4/1997 Kawamoto ......... F02D 41/0042
                                                             123/520

(Continued)

FOREIGN PATENT DOCUMENTS

JP 2011-256778 A 12/2011
JP 2015-110914 A 6/2015

*Primary Examiner* — Christopher P Jones
(74) *Attorney, Agent, or Firm* — Conley Rose, P.C.

(57) ABSTRACT

A fuel vapor processing apparatus includes a vapor path connecting an adsorbent canister to a tank, where a valve is disposed in the vapor path and comprises a body and a seat, and a control unit configured to detect a movement distance of the body from the seat as a valve movement distance at a valve opening start position. This position results when a change in inner pressure of the tank after starting movement of the body toward a valve opening direction becomes greater in magnitude than a predetermined amount, wherein the control unit stores the valve movement distance in the valve opening direction as a learning value, and also stores one of two predetermined restriction values as the learning value instead of the valve movement distance when the valve movement distance is not within a range between a previously stored learning value and one of the restriction values.

5 Claims, 6 Drawing Sheets

(51) Int. Cl.
  *B01D 53/04*   (2006.01)
  *F02D 41/24*   (2006.01)
  *F02D 41/30*   (2006.01)
  *F02M 25/08*   (2006.01)
  *B60K 15/035*  (2006.01)

(52) U.S. Cl.
  CPC ....... *F02D 41/004* (2013.01); *F02D 41/2438* (2013.01); *F02D 41/2451* (2013.01); *F02D 41/2464* (2013.01); *F02D 41/30* (2013.01); *F02M 25/089* (2013.01); *B01D 2253/102* (2013.01); *B01D 2257/7022* (2013.01); *B01D 2259/4516* (2013.01); *B60K 2015/03514* (2013.01); *F02D 2200/0602* (2013.01)

(58) Field of Classification Search
  CPC ...... B01D 53/0454; B60K 2015/03514; F02D 2200/0602; F02D 41/003; F02D 41/004; F02D 41/2438; F02D 41/2451; F02D 41/2464; F02D 41/30; F02M 25/089
  See application file for complete search history.

(56) References Cited

U.S. PATENT DOCUMENTS

| | | | |
|---|---|---|---|
| 2003/0074958 A1* | 4/2003 | Nagasaki | F02M 25/0818 73/114.41 |
| 2011/0220071 A1 | 9/2011 | Horiba et al. | |
| 2012/0031374 A1* | 2/2012 | Hokuto | F02D 35/027 123/445 |
| 2015/0143996 A1* | 5/2015 | Kimoto | B01D 53/0454 96/114 |
| 2015/0159566 A1 | 6/2015 | Akita et al. | |

\* cited by examiner

FUEL VAPOR PROCESSING APPARATUS

CROSS-REFERENCE TO RELATED APPLICATIONS

This application claims priority to Japanese patent application serial number 2015-226576, filed Nov. 19, 2015, the entire contents of which are incorporated herein by reference.

STATEMENT REGARDING FEDERALLY SPONSORED RESEARCH OR DEVELOPMENT

Not applicable.

BACKGROUND

This disclosure relates to a fuel vapor processing apparatus.

Japanese Laid-Open Patent Publication No. 2015-110914 discloses a fuel vapor processing apparatus having a closing valve that is disposed in a vapor path between a fuel tank and an adsorbent canister, where said closing valve is composed of a valve body and a valve seat. Under a condition where a movement distance of the valve body from an initial completely closed position toward a valve opening direction, i.e., in a direction away from the valve seat, is less than a predetermined distance, the closing valve stays in a closed state such that the fuel tank is hermetically closed. However, when the valve body moves a distance that is greater than or equal to the predetermined distance from the initial completely closed position toward the valve opening direction, after starting movement of the valve body for opening the closing valve, the valve body reaches a valve opening start position where the closing valve allows communication between the fuel tank and the adsorbent canister to occur. Accordingly, in order to quickly open the closing valve, the valve opening start position is previously learned, and the valve body is moved from the learned valve opening start position or a position proximal to it in a normal opening operation of the closing valve. Such learning requires previous detection of the valve opening start position. The detection operation is carried out by moving the valve body from the initial completely closed position toward the valve opening direction and detecting a position of the valve body when an inner pressure of the fuel tank decreases to a predetermined detection level.

However, the inner pressure of the fuel tank changes depending on its surrounding environment, so a simple method for detecting the valve opening start position based on the decrease in the inner pressure often causes false detection thereof. For example, when a large amount of fuel vapor is generated in the fuel tank, the inner pressure of the fuel tank increases. Under such a condition, there is a possibility that even when the valve body reaches an actual valve opening start position, a sufficient amount of the fuel vapor may not have been discharged from the fuel tank to reduce the inner pressure of the fuel tank to the requisite predetermined detection level. As a result, such conditions imposed due to the surrounding environment can prevent the fuel vapor processing apparatus from detecting the actual valve opening start position.

To address this concern, the fuel vapor processing apparatus disclosed in Japanese Laid-Open Patent Publication No. 2015-110914 is configured to correct the detected valve opening start position based on an increased amount of the inner pressure in the fuel tank. Such correction is performed by detecting the valve opening start position based on the decrease in the tank inner pressure, calculating a correction value based on an amount of change in the tank inner pressure after starting an operation for detecting the valve opening start position, and then calculating a corrected valve opening start position based on the detected valve opening start position and the calculated correction value.

However, such correction of the valve opening start position at every instance of a detection operation is redundant, requires a lot of time, and is inefficient. Accordingly, there has been a need for improved fuel vapor processing apparatuses.

BRIEF SUMMARY

In one aspect of this disclosure, a fuel vapor processing apparatus includes an adsorbent canister filled with an adsorbent, a vapor path connecting the adsorbent canister to a fuel tank, a closing valve comprising a valve body and a valve seat disposed in between the canister and tank in the vapor path, a pressure sensor configured to detect the inner pressure of the fuel tank, and a control unit connected to both the closing valve and the pressure sensor. The closing valve is kept closed under the condition where a valve movement distance of the valve body from the valve seat in a valve opening direction is less than a predetermined distance. The control unit is capable of detecting the valve movement distance of the closing valve at a valve opening start position which occurs when a change amount of the inner pressure of the fuel tank becomes greater than a predetermined amount after the valve body starts moving toward the valve opening direction. The control unit then stores the valve movement distance at the valve opening start position as a learning value. The control unit is configured to store one of a first restriction value and a second restriction value as the learning value instead of the valve movement distance at the valve opening start position when the valve movement distance at the valve opening start position is not within a range between a previously stored last learning value and one of the first restriction value and the second restriction value. The first restriction value is obtained by adding a first predetermined value to the last learning value. The second restriction value is obtained by subtracting a second predetermined value from the last learning value.

According to this aspect, when the difference between the valve opening start distance and the previously stored last learning value is greater than the second predetermined value, the restriction value is stored as the learning value. Such correction of the learning value can reduce time required for correction of the learning value.

DETAILED DESCRIPTION

Each of the additional features and teachings disclosed above and below may be utilized separately or in conjunction with other features and teachings to provide improved fuel vapor processing apparatuses. Representative examples, which utilize many of these additional features and teachings both separately and in conjunction with one another, will now be described in detail with reference to the attached drawings. The detailed description disclosed herein is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
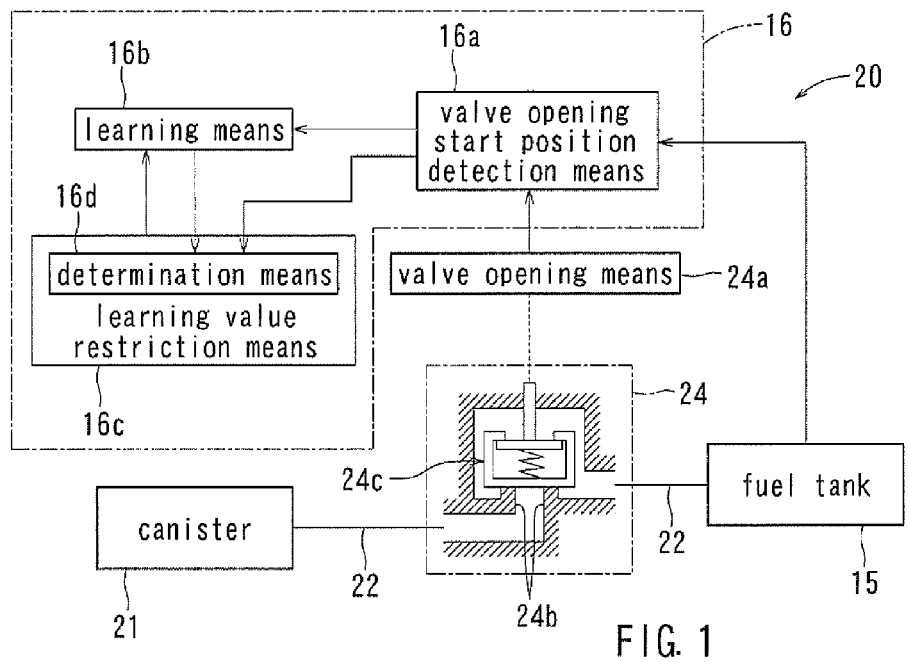
FIG. 1 is a functional block diagram of a fuel vapor processing apparatus having a closing valve according to a first embodiment.

As shown in FIG. 1, a fuel vapor processing apparatus 20 according to a first embodiment includes an adsorbent canister 21 and a vapor path 22 connecting the adsorbent canister 21 to a fuel tank 15. The adsorbent canister 21 is filled with an adsorbent such as activated carbon for trapping fuel vapor flowing into the adsorbent canister 21 from the fuel tank 15 via the vapor path 22. A closing valve 24 is provided in the vapor path 22 in between the adsorbent canister 21 and the fuel tank 15 and is opened and closed by a valve opening means 24a. The closing valve 24 includes a valve seat 24b and a valve body 24c and is configured to be closed while the movement distance of the valve body 24c from an initial position, i.e., a completely closed position, toward a valve opening direction is less than a predetermined value. The closing valve 24 may be composed of a globe valve having the valve seat 24b facing the valve body 24c in a moving direction of the valve body 24c as shown in FIG. 1. Alternatively, closing valve 24 may be comprised of other types of valves such as a ball valve in which a flow passage is opened and closed by rotating a ball having a through-hole. The valve opening means 24a is connected to a control unit 16 (also referred to as "engine control unit (ECU)"). The control unit 16 includes a microcomputer composed of various electronic components such as a CPU and a memory where the microcomputer is configured to perform functions as a valve opening start position detection means 16a, a learning means 16b, a learning value restriction means 16c and a determination means 16d, based on specific algorithms and programs stored in the memory.

After commencing the valve opening operation of the closing valve 24, the valve opening start position detection means 16a detects gas pressure in the fuel tank 15 as tank inner pressure. When a change in the tank inner pressure exceeds a predetermined value, the valve opening start position detection means 16a detects a valve opening start position based on a valve movement distance of the closing valve 24, i.e., a movement distance of the valve body 24c toward the valve opening direction, at that time when the tank inner pressure has exceeded said predetermined value. The learning means 16b then stores said detected valve opening start position as a learning value of the valve opening start position in order to use it for performing the valve opening operation of the closing valve 24. The valve opening start position may be calculated from and shown based on the movement distance of the valve body 24c in the valve opening direction. Thus, as used herein, the valve movement distance at the valve opening start position is referred to as a valve opening start distance.

When the difference between a newly detected valve opening start position and the learning value previously stored in the learning means 16b is greater than a predetermined allowable change value, the learning value restriction means 16c then calculates a pair of restriction values and sets one of the restriction values as a new learning value based on the detected valve movement distance. Each of the restriction values is obtained by adding or subtracting the allowable change value to or from the stored last learning value, respectively. The learning means 16b then stores the selected restriction value as the learning value, instead of the detected valve opening start position. More specifically, the learning value restriction means 16c includes the determination means 16d configured to compare the detected valve opening start position with the restriction values, and to subsequently determine whether the detected valve opening start position is within an allowable range, i.e., between the pair of the restriction values. When the determination means 16d determines that the valve opening start position is not within the allowable range, the learning value restriction means 16c sets one of the restriction values as the new learning value. Conversely, when the determination means 16d determines that the valve opening start position is within the allowable range, the learning value restriction means 16c sets the valve opening start position as the new learning value. Then, the learning means 16b stores the set learning value as the new learning value.

Figure 3:
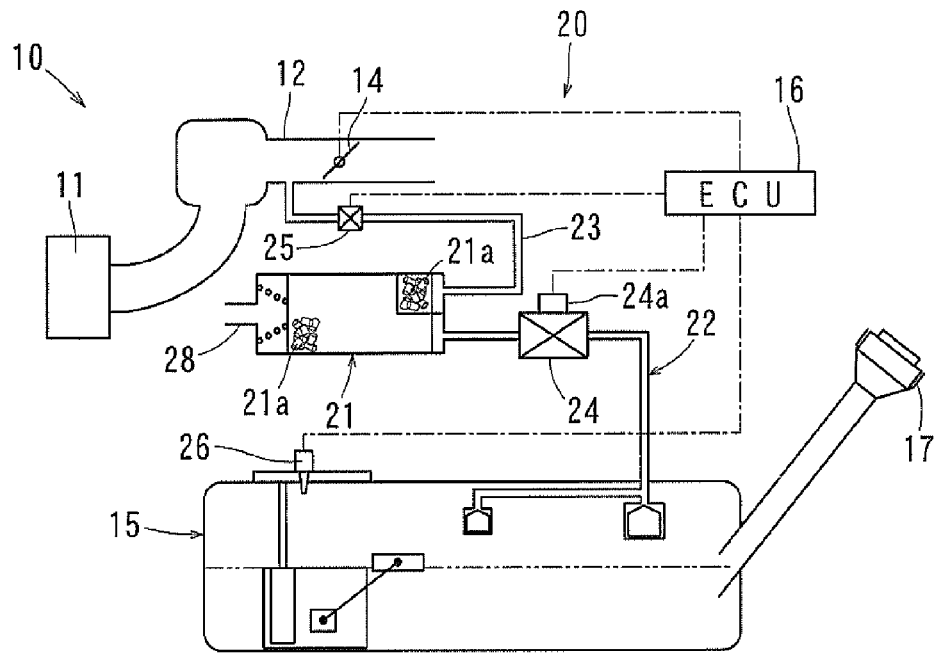
FIG. 3 is a schematic diagram of the fuel vapor processing apparatus according to the first embodiment.

FIG. 3 shows an engine system 10 equipped with the fuel vapor processing apparatus 20 according to the first embodiment. The engine system 10 is configured to supply a gas mixture of air and fuel to an internal combustion engine 11 (referred to as "engine", hereinafter) via an intake path 12. Flow rates of the air and the fuel in the gas mixture are controlled by a throttle valve 14 and a fuel injection valve (not shown), respectively. The throttle valve 14 is connected to the control unit 16 for transmitting signals relating to an opening amount of the throttle valve 14. The control unit 16 is connected to the fuel injection valve for controlling open time of the fuel injection valve that is supplied with the fuel from the fuel tank 15.

The fuel vapor processing apparatus 20 includes the adsorbent canister 21 connected to the fuel tank 15 via the vapor path 22 for trapping, in the adsorbent canister 21, fuel vapor generated during refueling and fuel vapor vaporized in the fuel tank 15 as described above. The fuel vapor adsorbed in the adsorbent canister 21 is purged and supplied to the intake path 12 downstream of the throttle valve 14 via a purge path 23 during a purge operation. The closing valve 24 disposed in the vapor path 22 is composed of a step motor-type valve and is opened and closed by the valve opening means 24a, i.e., a step motor. The purge path 23 has a purge valve 25 for controlling fluid communication through the purge path 23.

The adsorbent canister 21 is filled with activated carbon 21a as adsorbent for trapping the fuel vapor flowing into the adsorbent canister 21. The adsorbent canister 21 is connected to an atmospheric path 28, which is open to the atmosphere and is configured to suction atmospheric air at a position near a fill opening 17 of the fuel tank 15. When starting the purge operation, negative pressure is applied to the adsorbent canister 21 via the purge path 23, and thus, atmospheric air flows into the adsorbent canister 21 through the atmospheric path 28 to compensate for the negative pressure. Consequently, the fuel vapor purged from the adsorbent canister 21 is supplied to the engine 11 via the purge path 23 and the intake path 12.

The control unit 16 receives various signals, e.g., detection signals from a pressure sensor 26, which is configured to detect the inner pressure of the fuel tank 15, in order to perform various operations for controlling the fuel vapor processing apparatus 20. Such operations include, for example, controlling the open time of the fuel injection valve, opening and closing each of the closing valve 24 and the purge valve 25.

Figure 4:
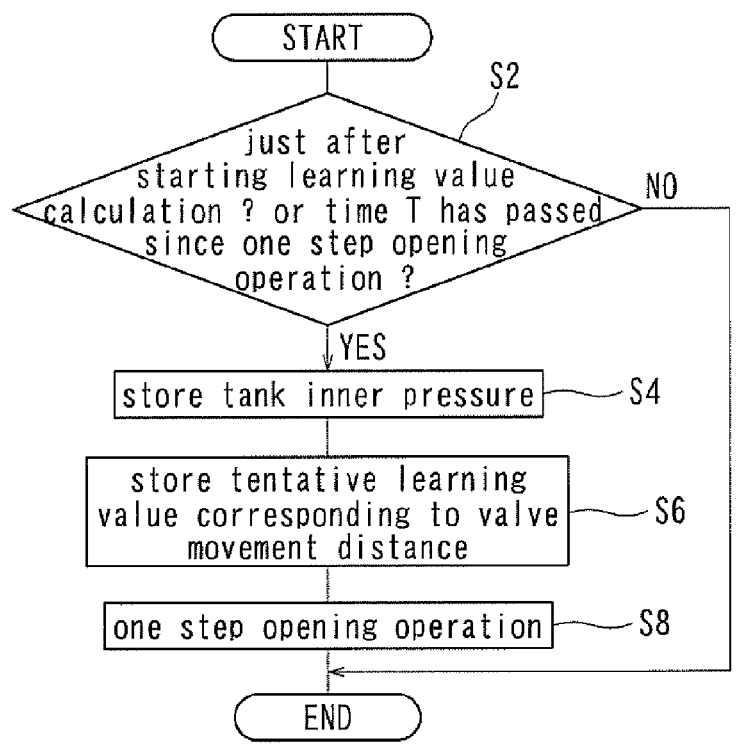
FIG. 4 is a flowchart showing a valve opening operation for the closing valve according to the first embodiment.

Next, a valve opening control operation of the closing valve 24, which is carried by the control unit 16, will be described in reference to FIGS. 4 and 7. As shown in FIG. 4, when this operation is started, it is determined, at a step S2, whether it is just after a learning value calculation operation is started, or whether a predetermined time T has passed since the step motor 24a opened the closing valve 24 by one step, i.e., since the step motor 24a moved the valve body 24c by one step toward the valve opening direction. The learning value calculation operation is carried out just after starting the engine system 10, so when it is just after starting the engine system 10, the step S2 is determined as Yes. As shown by "valve movement distance" in FIG. 7, the closing valve 24 is opened in a stepped manner every T seconds, that is, the step motor 24a moves the valve body 24c along the valve opening direction by one step every T seconds. This operation for moving the valve body 24c along the valve opening direction by one step is referred to as "one step opening operation", hereinafter. Thus, when T seconds have passed since a last one step opening operation, the step S2 is determined as Yes. When neither of conditions are met, the step S2 is determined as No, and then the valve opening control operation is finished.

When the step S2 is determined as Yes, the control unit 16 stores the inner pressure of the fuel tank 15, which is detected by the pressure sensor 26 at that time, in the memory at a step S4. At a next step S6, the control unit 16 stores the movement distance of the valve body 24c, which is calculated from a driving quantity of the step motor 24a and corresponds to the opening amount of the closing valve 24, in the memory as tentative learning value. Then, in step S8, the step motor 24a moves the valve body 24c by one step toward the valve opening direction.

Figure 7:
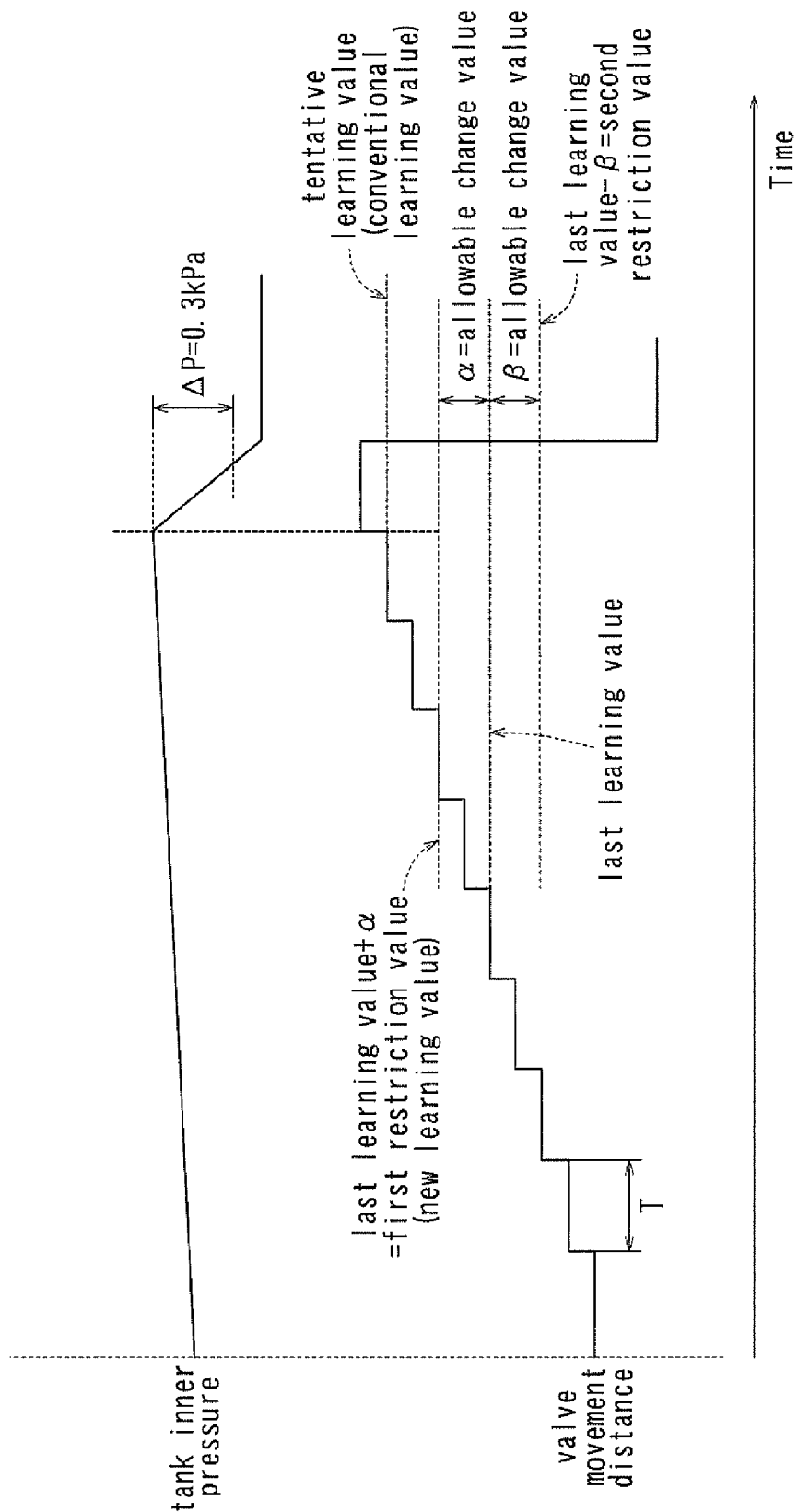
FIG. 7 is an operation timing diagram of the learning value calculation operation according to the first embodiment.

By the above-described operations, the closing valve 24 is opened in the stepped manner as shown by the "valve movement distance" in FIG. 7. The tank inner pressure and the tentative learning value are stored at every one step opening operation.

Figure 5:
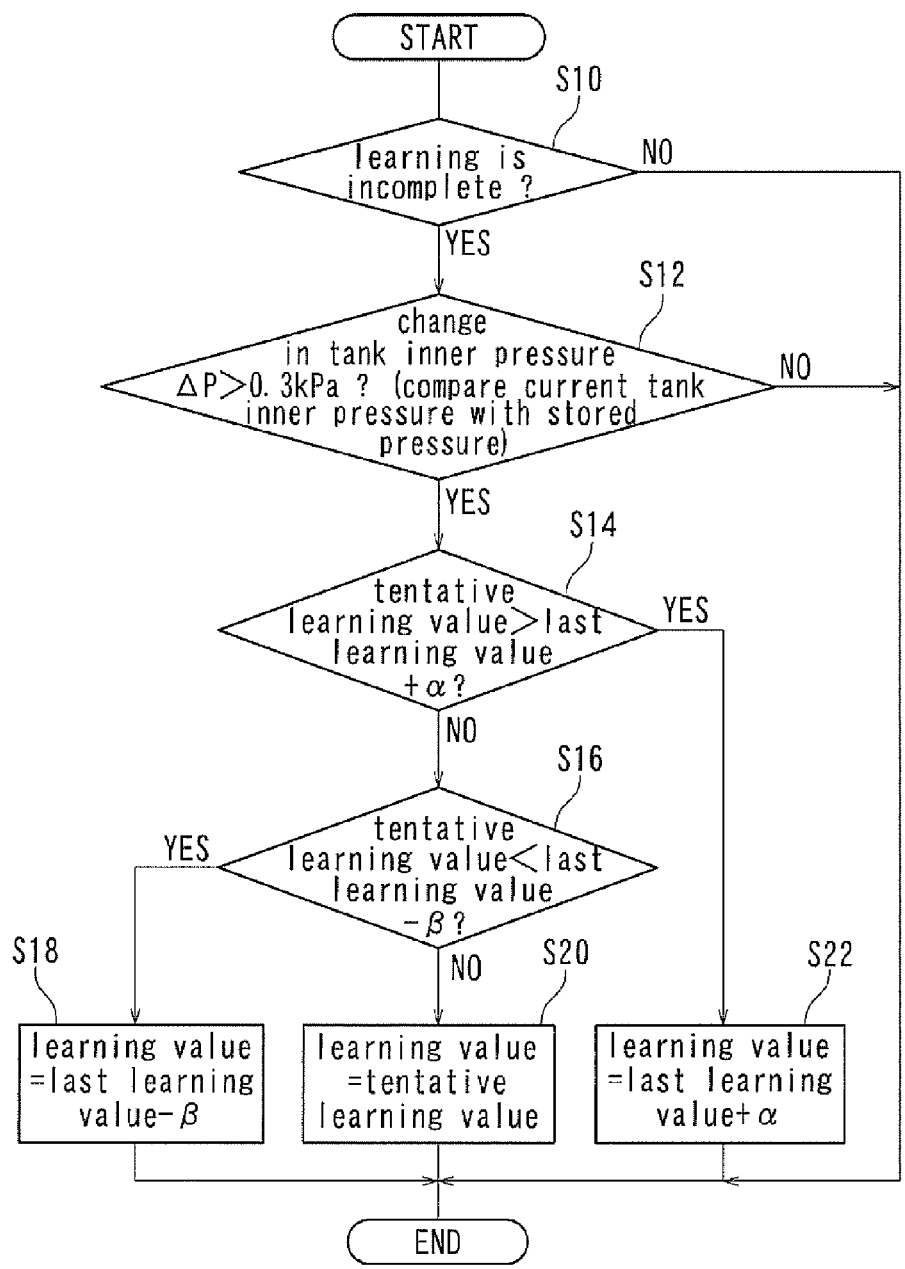
FIG. 5 is a flowchart showing a learning value calculation operation for the closing valve according to the first embodiment.

FIG. 5 shows the learning value calculation operation for learning the valve opening start position of the closing valve 24. After starting this operation, it is determined whether learning of the valve opening start position is incomplete at a step S10. When the learning is completed, the step S10 is determined as No, and this operation is finished.

When the learning is not completed, the step S10 is determined as Yes, and then it is determined whether a change in the tank inner pressure is greater than a predetermined value (for example, the predetermined value is 0.3 kPa) at a step S12. The change in the tank inner pressure is calculated from the difference in pressure between the last tank inner pressure stored at the step S4 and a current tank inner pressure newly detected by the pressure sensor 26. When the change in the tank inner pressure, defined by said difference, is equal to or less than the predetermined value, the step S12 is determined as No, and this operation is finished. Conversely, when the change in the tank inner pressure is greater than the predetermined value, the step S12 is determined as Yes, and the operation progresses to a next step S14.

At the step S14, it is determined whether the tentative learning value stored at the step S6 is greater than a value obtained by adding an allowable change value $\alpha$ to a last learning value that was calculated during a previous learning value calculation operation. The value obtained by adding the allowable change value $\alpha$ to the last learning value corresponds to one of the aforementioned restriction values and a first restriction value in this disclosure. When the tentative learning value is greater than the first restriction value, the step S14 is determined as Yes, and then instead of the tentative learning value, the first restriction value is newly stored as the learning value at a step S22. When the tentative learning value is equal to or less than the first restriction value, the step S14 is determined as No, and the operation progresses to a next step S16.

At the step S16, it is determined whether the tentative learning value is less than a value obtained by subtracting an allowable change value $\beta$ from the last learning value. The value obtained by subtracting the allowable change value $\beta$ from the last learning value corresponds to the other one of the restriction values and a second restriction value in this disclosure. When the tentative learning value is less than the second restriction value, the step S16 is determined as Yes, and then instead of the tentative learning value, the second restriction value is newly stored as the new learning value at a step S18. Alternatively, when the tentative learning value is equal to or greater than the second restriction value, the step S16 is determined as No, and then the tentative learning value is newly stored as the learning value at a step S20.

FIG. 7 is an operation timing diagram showing one example of the learning value calculation operation. When the tank inner pressure of the fuel tank 15 has decreased from the inner pressure stored at the step S4 by a greater amount than the predetermined value $\Delta P$ (0.3 kPa), the tentative learning value stored at the step S6 is compared with the first restriction value obtained by adding the allowable change value $\alpha$ to the last learning value and/or the second restriction value obtained by subtracting the allowable change value $\beta$ from the last learning value. In the specific case shown in FIG. 7, when the decrease in the tank inner pressure is greater than the predetermined value, the tentative learning value last stored at the step S6 is greater than the first restriction value, and thus the first restriction value is set as the new learning value.

Figure 8:
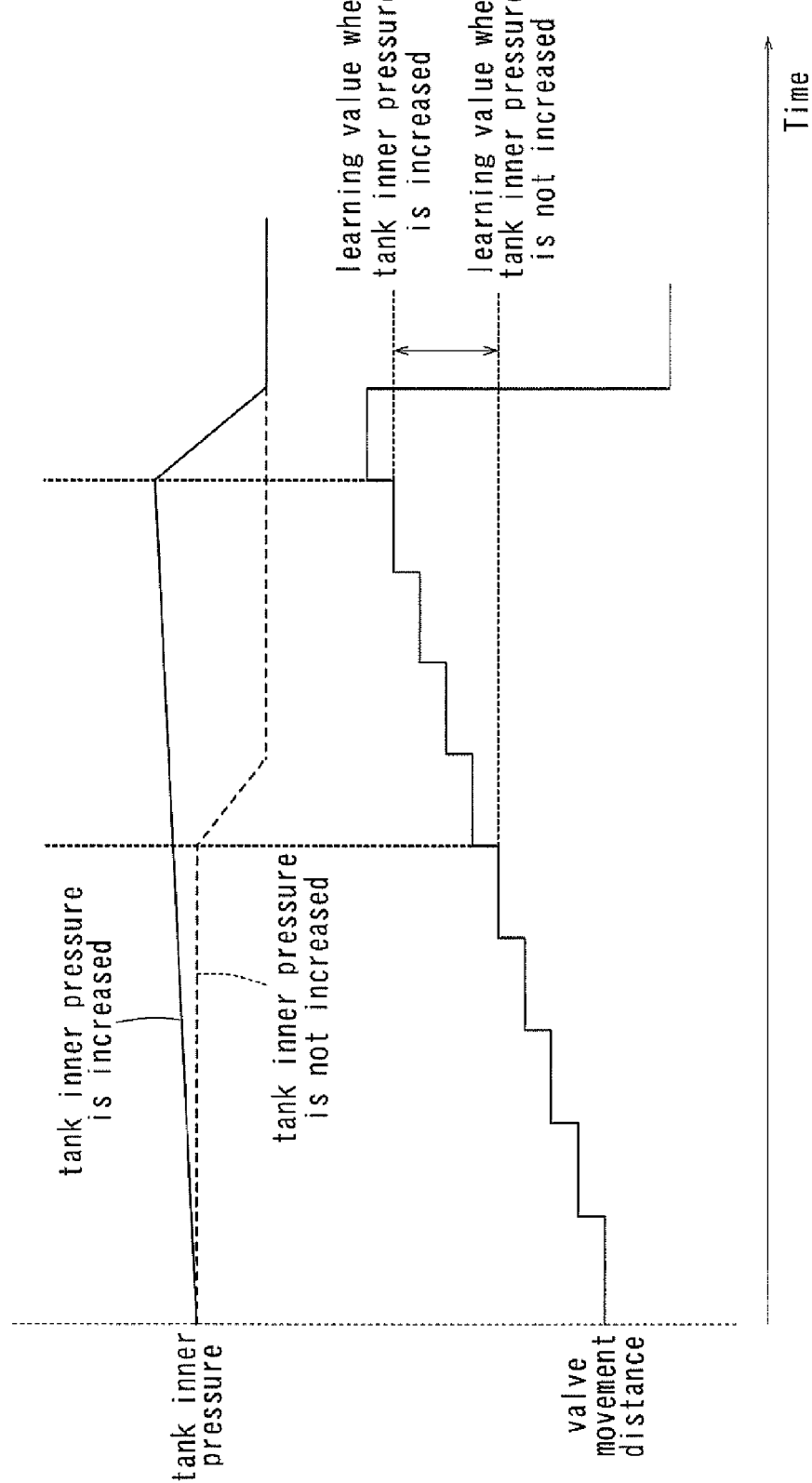
FIG. 8 is an operation timing diagram of the learning value calculation operation performed by a conventional fuel vapor processing apparatus.

FIG. 8 is an operation timing diagram showing one example of a conventional prior art learning value calculation operation without correction of the learning value of this disclosure, as disclosed in the instant invention. In a case where a tank inner pressure is not increased by surrounding environment, the tank inner pressure varies as shown by a dashed line. Under such a condition, a valve movement distance at an actual valve opening start position can be precisely detected based on the change in the tank inner pressure as it is not affected by the effect of the surrounding environment on the tank inner pressure. Thus, an accurate learning value including no error can be calculated from the detected valve movement distance at the actual valve opening start position. However, in the case where the surrounding environment increases the tank inner pressure, the tank inner pressure varies as shown by a solid line in FIG. 8. When the learning value is calculated based on the tank inner pressure shown by the solid line, the calculated learning value from the change in inner pressure is distant from the accurate learning value by four steps of the step motor 24a as shown by the vertical double-headed arrow in FIG. 8. If this inaccurate learning value is used for the valve opening operation of the closing valve 24, the valve opening operation is carried out under a condition where a position distant from the actual valve opening start position by 4 steps in the valve opening direction is recognized as the valve opening start position.

In the case of the first embodiment shown in FIG. 7, in the instant invention, when the increase in the tank inner pressure caused by the surrounding environment widely increases the valve movement distance detected as the valve opening start distance, the first restriction value is set as the learning value instead of the tentative learning value corresponding to the detected valve movement distance, which has been influenced by the surrounding environment. Thus, error of the learning value can be reduced by creating a zone of allowable ranges in this manner. Furthermore, influence of inaccurate learning can be decreased to the minimum by properly deciding the allowable change value α. For example, when the allowable change value α is set to a value substantially corresponding to variation in motion of the closing valve 24, setting of the first restriction value as the learning value can absorb such variation in motion of the closing valve 24.

FIG. 7 shows the case where the change in the tank inner pressure increases the valve movement distance detected as the valve opening start distance compared with the last learning value. In another case, not shown, where the change in the tank inner pressure widely decreases the valve movement distance detected as the valve opening start distance below the second restriction value, the second restriction value is set as the learning value.

Under a normal condition where the surrounding environment of the fuel tank 15 does not affect the inner pressure of the fuel tank 15, because the valve movement distance at the actual valve opening start position can be detected precisely, the learning value of the valve opening start position can be determined without error. Further, changes in the inner pressure of the fuel tank 15 caused by the surrounding environment of the fuel tank 15 do not frequently occur. Thus, corrections of the learning value do not cumulatively cause excess accumulation of the allowable change value α or β on the accurate learning value, so wide shift of the learning value from the accurate learning value corresponding to the actual valve opening start position does not occur under normal use. Therefore, only when the surrounding environment of the fuel tank 15 significantly affects the inner pressure of the fuel tank 15, the amount of change in the learning value is limited to the allowable change value in order to increase accuracy of the learning value. Furthermore, as compared to the prior art, it is not necessary to correct the learning value at every calculation of the learning value, so the time required for calculation can be reduced.

Figure 2:
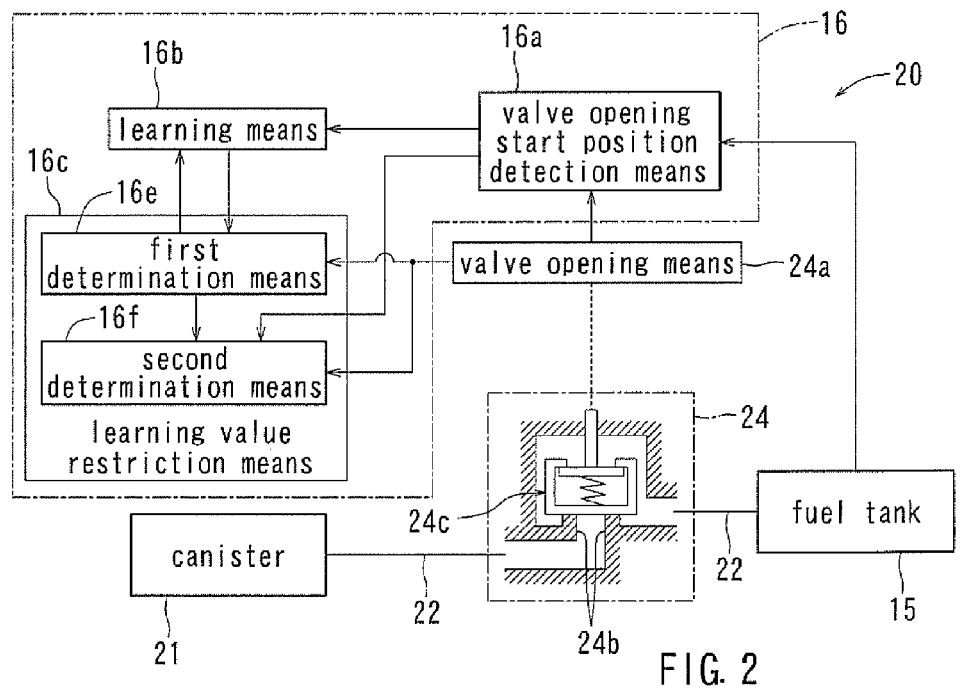
FIG. 2 is a functional block diagram of the fuel vapor processing apparatus according to a second embodiment.

Next, a second embodiment will be described in view of FIG. 2. The second embodiment is characterized in that determination for setting the learning value to the restriction value is performed at an early step. Other configurations of the second embodiment coincide with those of the first embodiment, and thus will not be described again.

In the second embodiment, the learning value restriction means 16c includes a first determination means 16e and a second determination means 16f instead of the determination means 16d. That is, the control unit 16 is configured to perform functions as the means 16a-16c and 16e-16f through specific algorithms and programs stored in the memory as aforementioned. The first determination means 16e compares the tentative learning value, corresponding to the valve movement distance of the closing valve 24 at the time, with the first restriction value obtained by adding the predetermined allowable change value α to the last learning value stored by the learning means 16b in order to determine whether the tentative learning value is greater than the first restriction value. If the first determination means 16e determines that the tentative learning value is greater than the first restriction value, then the learning value restriction means 16c sets the first restriction value as the learning value. The learning means 16b then stores the first restriction value as the new learning value.

When the first determination means 16e determines that the tentative learning value is equal to or less than the first restriction value and when the valve opening start position detection means 16a detects the valve opening start position in response to the change in the tank inner pressure, the second determination means 16f compares the tentative learning value, corresponding to the valve movement distance at the valve opening start position, with the second restriction value obtained by subtracting the predetermined allowable change value β from the last learning value stored by the learning value 16b in order to determine whether the tentative learning value is less than the second restriction value. If the second determination means 16f determines that the tentative learning value is less than the second restriction value, then the learning value restriction means 16c sets the second restriction value as the learning value. Alternatively, when the second determination means 16f determines that the tentative learning value is equal to or greater than the second restriction value, the learning value restriction means 16c sets the tentative learning value as the learning value.

Figure 6:
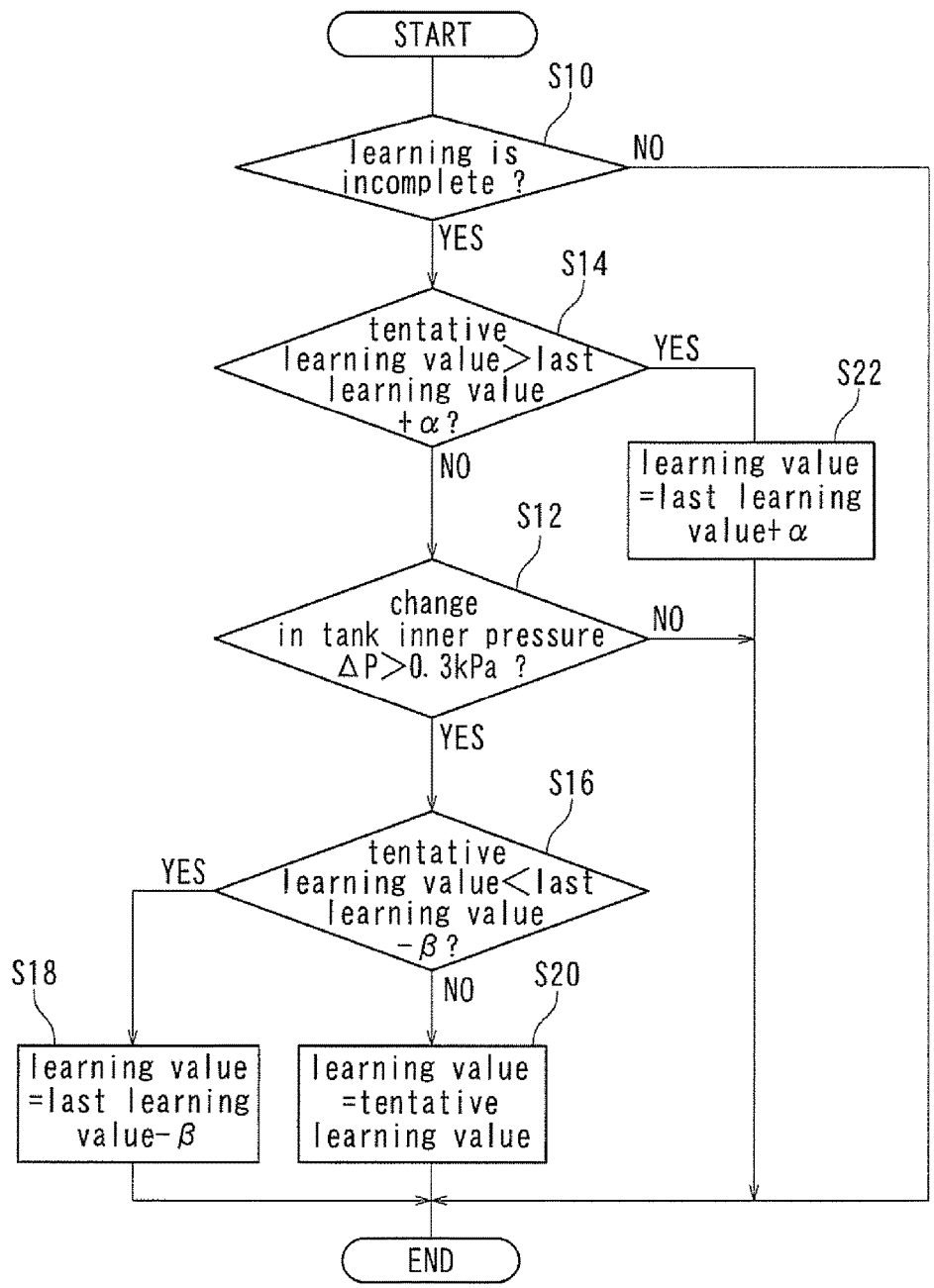
FIG. 6 is a flowchart showing the learning value calculation operation for the closing valve according the second embodiment.

FIG. 6 shows a learning value calculation operation according to the second embodiment, which is performed by the control unit 16. The only difference between this operation and the operation of the first embodiment shown in FIG. 5 is the ordering of the steps, such that the processes in each step of the second embodiment are substantially same as those of the corresponding steps in the first embodiment.

After starting the learning value calculation operation, it is first determined whether the learning is incomplete at the step S10. When the step S10 is determined as Yes, it is determined whether the tentative learning value is greater than the first restriction value obtained by adding the allowable change value α to the last learning value at the step S14. When the tentative learning value is greater than the first restriction value, the step S14 is determined as Yes, and then the first restriction value is set as the learning value at the step S22. When the tentative learning value is equal to or less than the first restriction value, the step S14 is determined as No, and then it is subsequently determined whether the change in the tank inner pressure is greater than the predetermined value (0.3 kPa) at the step S12. When the change in the tank inner pressure is equal to or less than the predetermined value, the step S12 is determined as No, and the operation is finished. When the change in the tank inner pressure is greater than the predetermined value, the step S12 is determined as Yes, and the operation progresses to the step S16. The subsequent processing from the step S16 is same as that of the first embodiment shown in FIG. 5.

According to the second embodiment, it is determined whether the tentative learning value is greater than the first restriction value at the step S14 before it is determined whether the change in the tank inner pressure is greater than the predetermined value at the step S12. Further, when the tentative learning value is greater than the first restriction value, the first restriction value is immediately set as the learning value. In this manner, the control unit is able to set the first restriction value as the learning value without waiting for a time when the change in the tank inner pressure becomes greater than the predetermined value. Therefore, under a condition where the change in the tank inner pressure caused by the surrounding environment of the fuel tank 15 increases the tentative learning value detected as the valve opening start position while the change in the tank inner pressure may still be less than the predetermined value, the control unit is able to set the learning value at an earlier stage than the first embodiment and thus save time.

The means 16a-16f of the control unit 16 perform processes in the steps S2 to S22. In particular, the valve opening start position detection means 16a carries out processes in the steps S2, S4 and S12. The learning means 16b carries out processes in the steps S6 and S20. The learning value restriction means 16c carries out processes in the steps S14 to S18 and S22. The second determination means 16d carries out processes in the steps S14 and S16. The first determination means 16e carries out process in the step S14. The second determination means 16f carries out process in the step S16.

This disclosure can be modified without departing from the scope of the invention. For example, the pressure sensor 26 may be selected from various sensors such as a sensor simply detecting the inner pressure of the fuel tank 15 and another one capable of detecting change in the inner pressure. When the former is used, the control unit 16 detects change in the inner pressure by processing signal output from the pressure sensor 26. The valve opening means 24a may be composed of a continuously driven motor instead of the step motor. Moving speed of the valve body 24c during the valve opening control operation is preferably constant, but may be changed during the operation.

What is claimed is:

1. A fuel vapor processing apparatus comprising:
an adsorbent canister filled with an adsorbent;
a vapor path connecting the adsorbent canister to a fuel tank;
a closing valve disposed in the vapor path in between the adsorbent canister and the fuel tank and comprising a valve body and a valve seat;
a pressure sensor configured to detect inner pressure of the fuel tank; and
a control unit connected to the closing valve and the pressure sensor;
wherein the closing valve is kept closed while a valve movement distance of the valve body from the valve seat toward a valve opening direction is less than a predetermined distance;
wherein the control unit is capable of:
detecting the valve movement distance of the valve body as a valve movement distance at a valve opening start position when a change amount of the inner pressure of the fuel tank after starting movement of the valve body toward the valve opening direction becomes greater than a predetermined amount; and
storing the valve movement distance at the valve opening start position as a learning value; and
wherein the control unit is configured to store one of a first restriction value and a second restriction value as the learning value instead of the valve movement distance at the valve opening start position when the valve movement distance at the valve opening start position is not within a range between a previously stored last learning value and one of the first restriction value and the second restriction value, wherein the first restriction value is obtained by adding a first predetermined value to the last learning value, and wherein the second restriction value is obtained by subtracting a second predetermined value from the last learning value.

2. The fuel vapor processing apparatus according to claim 1,
wherein the control unit is configured to:
determine whether the valve movement distance at the valve opening start position is within a range between the first restriction value and the second restriction value;
store one of the first and second restriction values as the learning value when the valve movement distance at the valve opening start position is not within the range between the first restriction value and the second restriction value; and
store the valve movement distance at the valve opening start position as the learning value when the valve movement distance at the valve opening start position is within the range between the first restriction value and the second restriction value.

3. The fuel vapor processing apparatus according to claim 1,
wherein the control unit is configured to:
compare the valve movement distance of the valve body with the first restriction value after starting movement of the valve body toward the valve opening direction but before detecting the valve movement distance at the valve opening start position;
store the first restriction value as the learning value when the valve movement distance is greater than the first restriction value;
compare the valve movement distance at the valve opening start position with the second restriction value when the valve movement distance is not greater than the first restriction value and when the valve movement distance at the valve opening start position is detected;
store the second restriction value as the learning value when the valve movement distance at the valve opening start position is less than the second restriction value; and
store the valve movement distance at the valve opening start position as the learning value when valve movement distance at the valve opening start position is not less than the second restriction value.

4. The fuel vapor processing apparatus according to claim 1,
wherein the control unit is configured to store the first restriction value as the learning value when the valve movement distance at the valve opening start position is greater than the first restriction value.

5. The fuel vapor processing apparatus according to claim 1,
wherein the control unit is configured to store the second restriction value as the learning value when the valve movement distance at the valve opening start position is less than the second restriction value.

\* \* \* \* \*